United States Patent
Garg et al.

(12)

(10) Patent No.: US 12,386,624 B2
(45) Date of Patent: Aug. 12, 2025

(54) INVARIANT STATISTICS-BASED CONFIGURATION OF PROCESSOR COMPONENTS

(71) Applicant: Advanced Micro Devices, Inc., Santa Clara, CA (US)

(72) Inventors: Alok Garg, Boxborough, MA (US); Paul Keltcher, Boxborough, MA (US); Mayank Chhablani, Boxborough, MA (US); Furkan Eris, Boston, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 86 days.

(21) Appl. No.: 17/217,101

(22) Filed: Mar. 30, 2021

(65) Prior Publication Data

US 2022/0318017 A1 Oct. 6, 2022

(51) Int. Cl.
*G06F 9/38* (2018.01)
*G06F 9/4401* (2018.01)
*G06F 9/445* (2018.01)
*G06N 20/00* (2019.01)

(52) U.S. Cl.
CPC .......... *G06F 9/3836* (2013.01); *G06F 9/3842* (2013.01); *G06F 9/44505* (2013.01); *G06N 20/00* (2019.01)

(58) Field of Classification Search
CPC .. G06F 9/3836; G06F 9/3842; G06F 9/44505; G06F 9/3802; G06N 20/00

USPC ......................................................... 712/214
See application file for complete search history.

(56) References Cited

U.S. PATENT DOCUMENTS

| | | | |
|---|---|---|---|
| 9,753,731 B1* | 9/2017 | Puzovic | G06F 8/4441 |
| 2004/0181654 A1* | 9/2004 | Chen | G06F 9/3806 712/E9.035 |
| 2007/0050168 A1* | 3/2007 | Meijer | G06F 9/4492 702/119 |
| 2009/0125886 A1* | 5/2009 | Owens, II | G06F 11/3688 717/124 |
| 2013/0191825 A1* | 7/2013 | Muff | G06F 9/3848 718/1 |
| 2013/0198729 A1* | 8/2013 | Turner | G06F 8/443 717/151 |
| 2015/0301832 A1* | 10/2015 | Zhang | G06F 9/3861 712/207 |
| 2018/0173534 A1* | 6/2018 | Peled | G06F 9/3806 |
| 2021/0011726 A1* | 1/2021 | Alam | G06F 9/383 |
| 2022/0091850 A1* | 3/2022 | Ren | G06F 9/3842 |
| 2022/0197856 A1* | 6/2022 | Khasawneh | G06F 11/3452 |

* cited by examiner

*Primary Examiner* — Chun Kuan Lee
(74) *Attorney, Agent, or Firm* — Hickman Becker Bingham Ledesma LLP

(57) ABSTRACT

Techniques are described for a hardware processor to dynamically configure a component that improves a processor function with a configuration setting based on invariant statistics. The invariant statistics are generated by execution of the instructions from one or more applications and are independent of the performance metrics of the processor function for the execution. In an embodiment, the configuration setting for the component is generated using a machine learning model.

18 Claims, 5 Drawing Sheets

INVARIANT STATISTICS-BASED CONFIGURATION OF PROCESSOR COMPONENTS

FIELD OF THE TECHNOLOGY

The present invention relates to the field of hardware processors, in particular to the invariant statistics-based configuration of processor components.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A hardware processor contains many components (e.g., hardware components like pre-fetcher and branch predictor) that optimize various functions of the processor. Such a component may have settings, which, if configured properly, may improve the performance of the corresponding function of the hardware processor. However, even when configured properly, under the same setting, the performance of the function may be different when the hardware processor executes instructions of a different application. In some instances, a particular setting that improves the function for one application may, in fact, degrade performance for another application.

For example, a prefetcher is a component of a hardware processor that pre-loads the data into the cache memory of the processor. To improve latency associated with accessing data in system memory, a prefetcher may load data into the cache memory before the data is actually requested by the execution. If the prefetcher is correct and the data requested is found in the cache memory, hundreds of cycles are saved by avoiding accessing the data from the system memory, improving the execution of the processor.

To effectuate such improvement, a prefetcher implements prefetching algorithms to reduce the miss rate for data. However, it is extremely rare (and even impossible) to have a prefetching algorithm that would make correct guesses as to which data to pre-load for various applications. In fact, for some applications, prefetching algorithms may fetch information into caches that is not used in the execution, and therefore may hurt the performance of the hardware processor for those applications. Therefore, as an example, the configuration for a prefetcher to be enabled (ON) or disabled (OFF) may influence the hardware processor's execution performance. Many other components of a hardware processor (e.g., branch predictor) may have similar settings that affect the performance of the corresponding function depending on what settings are set for which applications. Therefore, intelligently configuring those configuration settings may considerably improve the processor's performance.

BRIEF DESCRIPTION OF THE DRAWINGS

In the drawings of certain embodiments in which like reference numerals refer to corresponding parts throughout the figures.

DETAILED DESCRIPTION

Figure 1:
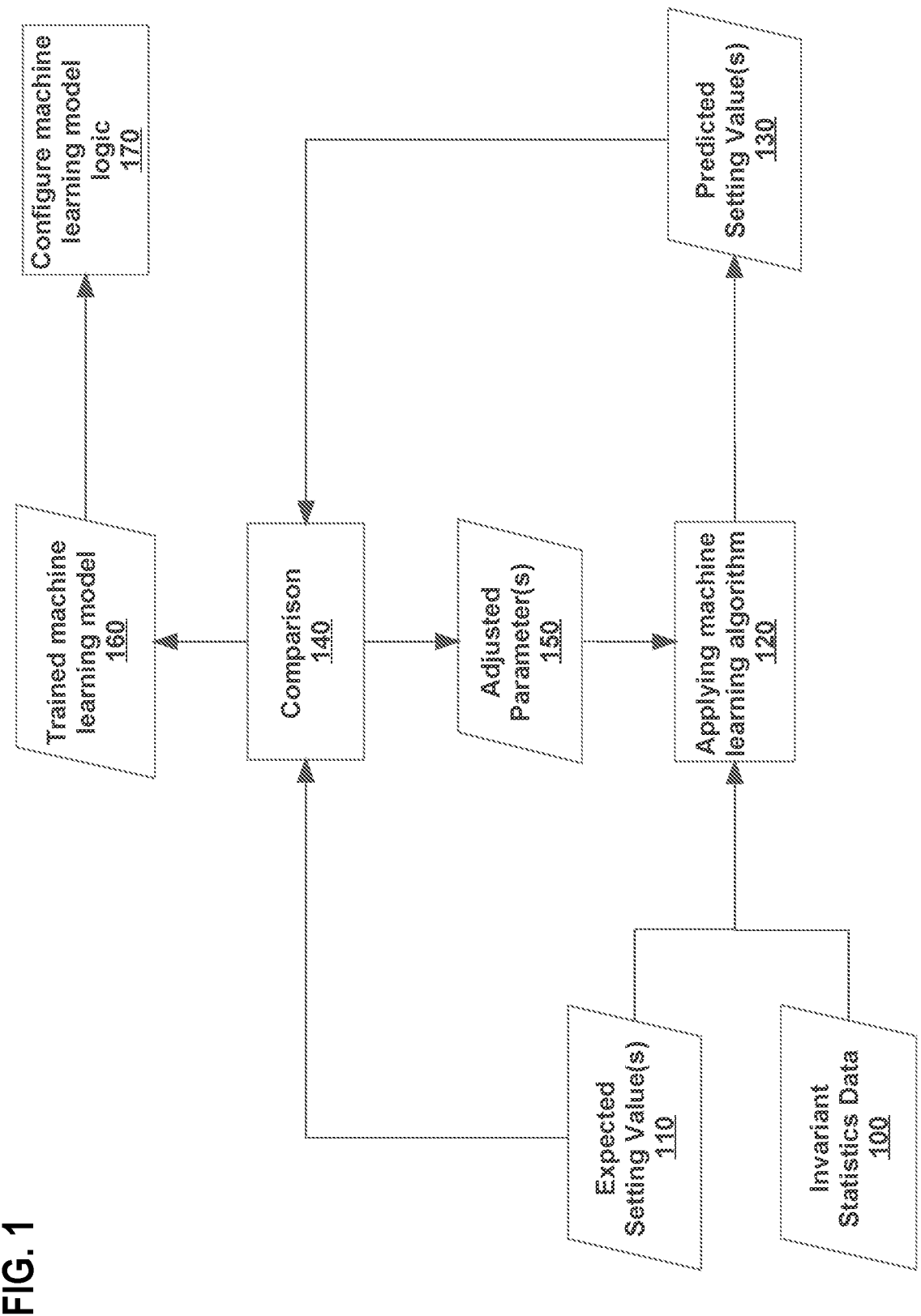
FIG. 1 is a flowchart that depicts training techniques to generate a machine learning model using invariant statistics for a hardware processor component, in an embodiment.

In the following description, for the purposes of explanation, numerous specific details are set forth in order to provide a thorough understanding of the embodiments. It will be apparent, however, that the embodiments may be practiced without these specific details. In other instances, structures and devices are shown in block diagram form in order to avoid unnecessarily obscuring the embodiments.

General Overview

Hardware processors may include component(s) that improve the processor's execution of instructions. A prefetcher or a branch predictor are examples of such components, which respectively improve cache hit rate when particular data is requested from the cache and the number of predicted branches when branch instructions are executed. These types of components that improve the respective functions of the hardware processor may be configurable. The most basic example of such a configuration setting is the component being enabled (ON) or disabled (OFF). Although the examples herein may describe only enabled/disabled configuration settings, the exact settings or combination of settings used for the configuration of a component is not critical to the techniques described herein.

One approach to improve hardware processor execution of instructions is to use heuristics to determine the optimal configuration. Using such an approach, in a trial-and-error-based method, programs are executed for a few thousand cycles with various different configurations for component(s). The performance metrics corresponding to the function of the components are collected over the execution and based on the performance metrics, the optimal configuration for the components is selected. Because the heuristic approach is based on the trial-and-error methodology, large dynamic datasets of configurations cannot be used. Heuristics are comprised of tracking a few parameters and using thresholds to enable/disable various components and, therefore, are limited in the number of execution features that may be affected. Accordingly, the heuristics approach is not effective in eliminating the negative impact that configured components may have on the execution of other programs on which heuristics was not performed.

Another approach is to train a machine learning algorithm with the performance metrics for the function of a component to determine the most optimal setting for the component. Based on this approach, a training set is generated from the performance metrics of the function: by running various applications under known optimal configuration settings for the application and collecting the performance metrics for each application. The training set is used to train a machine-learning algorithm to yield the machine learning model that would approximately generate optimal configuration settings dynamically at execution time given the corresponding set of performance metrics collected for the new application.

However, the use of performance metrics as an input to train the machine learning algorithm lacks robustness because it adds a feedback loop. The machine learning model at execution time generates a new configuration setting for the component, which changes the performance metrics, thereby invalidating the model that was trained on original performance metrics. Accordingly, a viable static machine learning model, whose complete training is performed before execution time and is not retrained during the execution time, may not be generated by performance metrics-based training.

Another challenge with training a machine learning algorithm based on performance metrics is that multiple components may affect the performance metrics. Therefore, to improve accuracy for the configuration, the machine learning algorithm is to be trained with the full set of permutations of configuration settings for all the components that affect the performance metrics of the corresponding processor function. Thus, even if each component has only ON and OFF settings (enabled/disabled), for eight components affecting the performance metrics, as an example, the model has to be trained for 2^8=256 different settings. Otherwise, when a new setting is encountered, the model would produce an inaccurate result. Training the model with the full set of permutation of settings is highly complex, and the complexity exponentially increases with each additional component.

Yet another challenge with training a machine learning algorithm based on the performance metrics of the component itself is when a component is replaced with another component of similar architecture, the training has to be re-done. The performance metrics of the changed component is different, and thus, the change necessitates the recollection of a training dataset and performing the retraining of the machine learning model. Such repetition of training may be particularly costly when the component is part of multiple components that affect the performance as described above.

To alleviate these problems, the approaches describe herein techniques for configuration logic that is not dependent on (and thus, excludes) the processor performance metrics for the processor function(s) improved by corresponding component(s). According to such techniques, the execution time configuration of component(s) is based on invariant statistics, which describes the execution of an application yet does not represent the performance of the function of the component.

The term "invariant statistics" refers herein to statistics that are generated from execution metrics related to the execution of an application (i.e., execution of the instructions thereof) by a hardware processor. The execution metrics for invariant statistics do not directly vary based on a configuration setting of the component for which the invariant statistics are generated. Stated differently, the change in the configuration does not necessarily yield a change in the execution metrics. Accordingly, the invariant statistics exclude the performance metrics for the processor function corresponding to a component.

In one embodiment, the invariant statistics for the component are collected on the application-level and, therefore, are based on the application-level execution properties or properties derived thereof. In another embodiment, the invariant statistics is dependent on the component of the hardware processor but is independent of its execution time configuration, which is nevertheless independent of the configuration setting of the component. Therefore, for the same application, regardless of the configuration setting of the component, the performance metrics for the processor function corresponding to the component stays unchanged during the execution of the application.

In an embodiment, a hardware processor includes a configuration logic that generates the appropriate configuration setting for a component of the hardware processor to improve the function of the hardware processor that corresponds to the component. The configuration logic receives execution metrics that were generated based on the prior execution of a set of instructions by the hardware processor and generates invariant statistics. In some embodiments, the invariant statistics generated by the configuration may be the same as the received execution metrics. The configuration logic may modify the configuration setting of the component based on the invariant statistics.

In one embodiment, the configuration logic may comprise of a rule-based engine that determines the new setting value(s) of the configuration setting based on threshold(s) for invariant statistics. If a metric value of the invariant statistics meets a particular threshold, a new setting value is assigned to the configuration setting of the component.

In another embodiment, the configuration logic includes a machine learning model logic that executes a machine learning model. The machine learning model receives a feature vector based on the invariant statistics and generates a predicted setting value for the configuration logic to configure the component with. The machine learning model is trained based on invariant statistics for which the optimal configuration settings of the component are known.

In an embodiment, the same trained machine learning model/rule engine is applicable for any component having the same function and the same configuration setting options. Because the invariant statistics generated during the execution time are independent of the configuration of the component, another component with the same function can be configured with the same machine learning logic/rule engine for the same configuration setting. Thus, changes to component's architecture do not trigger new training for the configuration logic. The new component may be configured by the configuration logic during the execution time to yield the same improvement in performance as the original component.

Although some embodiments or examples may refer to a single component for which a configuration setting is generated, the same techniques may be used to generate configuration settings for multiple components of the same type. Similarly, a component that has multiple configuration settings may have multiple configuration setting values generated for the component, one for each of the configuration settings, using the same techniques. In such an embodiment, each configuration setting may have its dedicated rule engine or machine learning model logic.

In an embodiment, the configuration logic may continuously adjust the configuration settings of the component based on application(s) being executed by the hardware processor. The invariant statistics executed for one period of the execution of application(s) may be used to modify the configuration settings of the component for the next period of execution, while the invariant statistics collected over the next period may be used to modify the configuration settings of the component for the period after. The length of each period may be based on time (clock cycles), a number of instructions, or any other logical divisions of the execution.

Generating Invariant Statistics

In an embodiment, a hardware processor includes metric counters that obtain execution metrics during or after the execution of instructions by the hardware processor. The metric counters may be hardware counters built into a processor to track (count) certain events that take place at the processor level, like the number of cycles and instructions that an application executed, memory accesses, and branch behavior. Such metric counters may generate execution metrics for the execution of an application by the hardware processor.

In an embodiment, based on the obtained execution metrics for executing an instruction set of an application by the hardware processor, invariant statistics are generated. The invariant statistics may be generated without any manipulation of the obtained execution metric or by applying various statistical functions to one or a combination of execution metrics.

The execution metrics for the invariant statistics may track instruction counts when the set of instructions is executed. For example, the invariant statistics may be calculated based on the following one or more execution metrics for executing the instruction set:

a number of dynamic instructions,
a number of static instructions,
a number of branch instructions, and
a number of target addresses per an indirect branch instruction.

Additionally or alternatively, the execution metrics for the invariant statistics may include memory access metrics for the execution of fetch/load/store instructions. For example, the invariant statistics may be calculated based on the following one or more memory access metrics:

a number of unique instruction addresses accessed,
a number of unique data addresses accessed,
a number of pages loaded, and
amount of memory loaded per page.

Additionally or alternatively, the execution metrics for the invariant statistics may include branch behavior metrics for the executed branch instructions of the set of instructions. For example, the invariant statistics may be calculated based on the following one or more branch behavior metrics:

a number of taken branch instructions,
a number of not taken branch instructions,
length of target offset,
a number of forward branches, and
a number of backward branches.

Additionally or alternatively, the execution metrics for the invariant statistics may be related to memory access pattern(s) when the set of instructions is executed. For example, to calculate the invariant statistics, a memory access pattern may be determined for memory access instruction(s) executed as part of the set of instructions. Thereby, the execution may be determined to include striding access, streaming access, or spatial access to memory. The number or proportion of memory accesses in each of these patterns may be calculated for the invariant statistics.

Additionally or alternatively, the execution metrics may include hardware architecture-dependent statistics for a particular type of component that is independent of all components' configuration settings chosen for dynamic configuration. For example, for prefetchers, any microarchitecture statistics related to branch prediction or average dispatch width of the machine may be included in the invariant statistics.

Training Machine Learning Algorithm

Because invariant statistics are independent of the performance metrics for a processor function of a component, the invariant statistics may be used for independently training a machine learning algorithm for the component. The trained model's accuracy is independent of the other components' configuration settings, therefore avoiding a complex training process.

In an embodiment, the training techniques may be performed on any one or more computer systems such as those described below. In another embodiment, the training of the machine learning algorithm may be performed on the hardware processor of the component or the computer system thereof. Accordingly, as more performance information is gathered for the invariant statistics on the hardware processor, the labels of the feature vectors in the training set may be modified accordingly, or the training set is appropriately expanded to accommodate new feature vectors with the corresponding labels. Therefore, the machine learning algorithm may be retrained to generate a new machine learning model to replace the initial machine learning model dynamically while the hardware processor is executing instructions.

FIG. 1 is a flowchart that depicts training techniques to generate a machine learning model using invariant statistics for a hardware processor component, in an embodiment. The techniques for generating the model include obtaining a set of input data (or "training data set"), invariant statistics data 100, and labels 110 reflecting the corresponding optimal configuration setting value. The training data set may be obtained by executing one or more applications (sets of instructions) with different configuration settings for a component and recording a vector of feature measurements that includes invariant statistics data 100. The performance metrics for the executions corresponding to each feature vector of invariant statistics data are also recorded. The configuration setting value that gives the best performance is labeled as positive classification and recorded as such in the training set for the corresponding feature vector. In some implementations, one or more component configurations are within a threshold percentage of the best performance metrics also receive a positive classification. Feature vectors that do not receive a positive classification receive a negative classification.

For example, the invariant statistics may be instructions per cycle, which indicates the average instructions completed per clock cycle. Each feature vector with the invariant statistics values receives a classification label of whether the performance is optimal with an enabled "ON" setting value for the prefetcher and thus have a positive label (e.g., "1") or with a disabled "OFF" setting value for the prefetcher and thus have a negative classification label (e.g., "0").

Accordingly, the corresponding expected configuration setting value, within labels 110, is determined for each feature vector of the invariant statistics data 100. Labels 110 and the corresponding invariant statistics 100 produce an example set for training a machine learning algorithm.

At step 120, the set of feature vectors formed based on invariant statistics data 100 are provided as input data set to a machine learning algorithm, which is configured with an initial set of parameter values. A variety of machine learning algorithms may be used to train a machine learning model: a decision tree, random forest, regression, neural network. However, the exact machine learning algorithm used is not critical to the techniques described herein.

The application of the parameters to invariant statistics data 100 yields a corresponding set of predicted setting values 130. At step 140, the loss of the training is calculated based on comparing the predicted setting values 130 with expected setting values 110. If the loss is above a threshold, the previous parameters with which the algorithm was executed are adjusted to yield new adjusted parameters 150, and the process is repeated. If the number of iterations for executing the machine learning algorithm, at step 120, has passed the threshold, then the training of the machine learning stops. Similarly, the training of the machine algorithm may stop if the loss has met the threshold. In such cases, the comparison step at 140 yields trained machine learning model 160. Trained machine learning model 160 is used to configure machine learning model logic at step 170 to receive invariant statistics data at execution time for which the expected setting values are unknown, and accurately output predicted configuration setting values for the component.

The exact architecture of the component may not affect the training of machine learning model 160 and, thus, the configuration logic for configuring the component. Using the techniques described above, machine learning model 160 is trained based on invariant statistics, which is not dependent on the performance of the function corresponding to the component. If expected setting values 110 for optimal performance are not changed then adjusted parameter(s) 150 stay the same. Therefore, at least if another component has the same configuration settings and has the same function for the hardware processor, trained machine learning model 160 may be reused for the component that is different from the component on which the machine learning logic was trained.

Processor Overview

Figure 2:
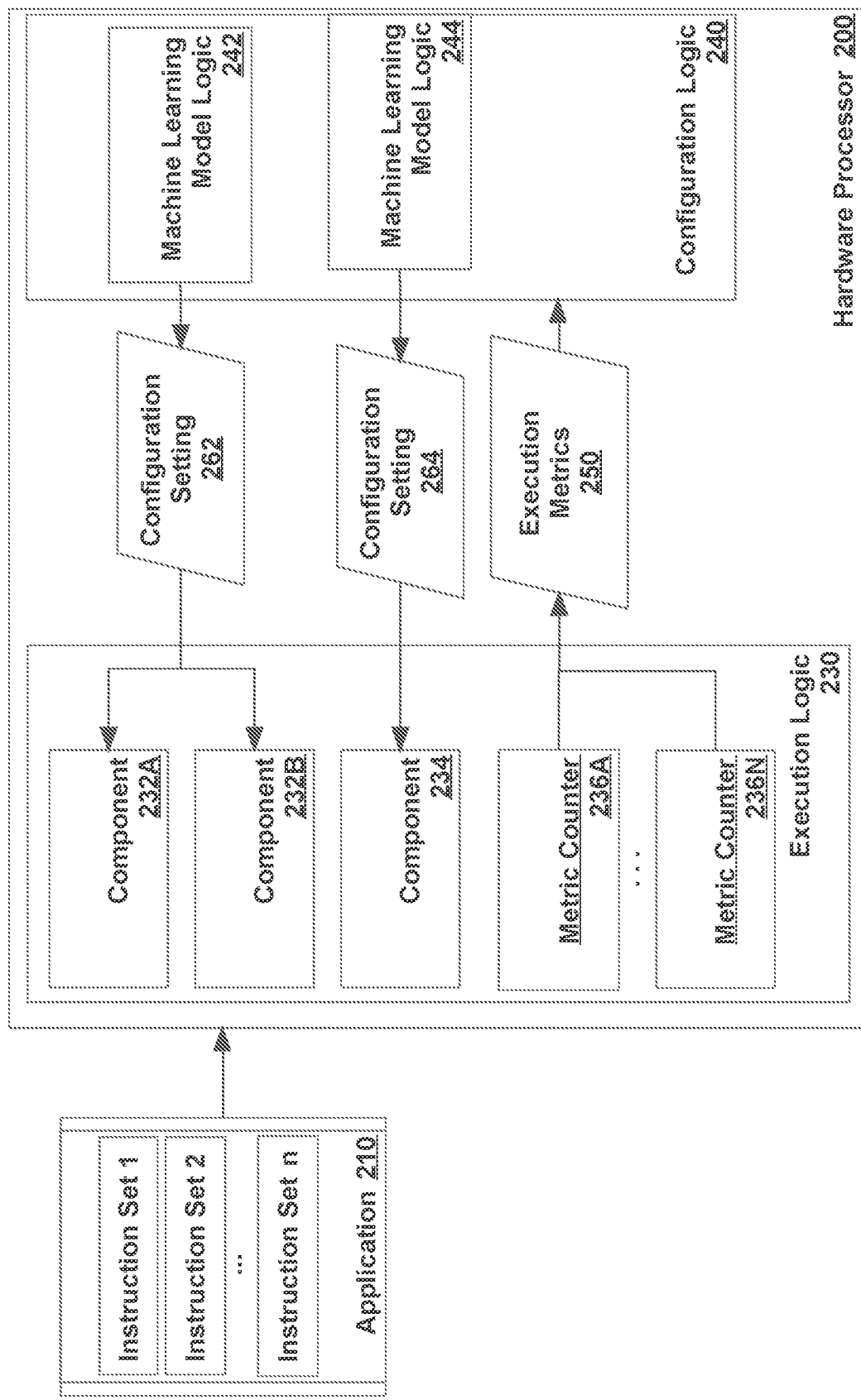
FIG. 2 is a block diagram that depicts hardware processor 200 with configurable components, in an embodiment.

FIG. 2 is a block diagram that depicts hardware processor 200 with configurable components, in an embodiment. Hardware processor 200 includes execution logic 230 and configuration logic 240. Execution logic 230 is configured to execute received instructions. To optimize the execution of instructions, execution logic 230 may contain one or more components such as components 232A/B and 234. Components 232A/B may be of the same component type and have the same function, and thereby have the same configuration settings. For example, component 232A/B maybe both prefetchers albeit for different address ranges of L2 cache.

In an embodiment, hardware processor 200 includes metric counters 236A . . . N. Metric counters 236A . . . N record various metrics about the execution of instructions by execution logic 230. Each of metric counters 236A . . . N may obtain a particular type of metric about execution: instruction statistics related, branch statistics related, and/or memory access related. Execution logic 230 received instruction sets 1 . . . N of application 210 and executed the instructions, thereby generating execution metrics about the execution. The generated execution metrics 250 is provided to configuration logic 240. The periodicity of providing execution metrics 250 may be based on the logical separation of instruction sets, the total amount of instructions executed, and/or based on the number of clock cycles.

In an embodiment, configuration logic 240 is configured to modify configuration settings of components 232A/B and 234. Configuration logic generates feature vector(s) of invariant statistics data based on received execution metrics 250. Configuration logic 240 includes machine learning model logics 242 and 244 to generate configuration settings 262/64 by inputting feature vectors based on invariant vector statistics data.

In an embodiment, configuration logic 240 may include a machine learning model logic per component. For example, configuration logic 240 includes machine learning model logic 244 configured to generate configuration setting 264 for component 234 based on the trained machine learning model for component 234.

In another embodiment, configuration logic 240 includes a single machine learning model logic for multiple components of the same type. In such an embodiment, the components of the same type have the same configuration and thus may be configured with the same configuration setting. For example, configuration logic 240 includes machine learning model logic 242 configured to generate configuration setting 262 for multiple components 232A/B of the same type based on the trained machine learning model for that type of component. Accordingly, for the example of component 232A and component 232B being prefetchers for L2 cache of hardware processor 200, the machine learning model of machine learning model logic 242 is trained to predict optimal configuration settings for both prefetchers 232A/B of hardware processor 200. Therefore, configuration setting 262 generated by machine learning model logic 242 is applied to configurations of both components 232A and 232B.

In yet another embodiment, a single component of hardware processor 200 may have multiple configuration settings (not depicted in FIG. 2). In such an embodiment, configuration logic 240 includes a separate machine learning model logic for each configuration setting of the component. Accordingly, configuration logic 240 is configured to apply multiple configuration settings to the same component of execution logic 230.

Each machine learning model logic may include a machine learning model trained based on invariant statistics data to accurately predict the corresponding configuration of a component. In an embodiment, the trained machine learning model is written into the memory of hardware processor 200. For example, a decision tree model that is generated for determining the predicted configuration of a prefetcher may be written into read-only memory (ROM). According to one approach, the decision tree model may be represented in ROM as a table in which each row indicates a node and contains the pointer(s), the neighbor node(s), and the respective probabilities to select one of the neighbor nodes for the traversal. During the execution time, when invariant statistics data is generated for a set of executed instructions by the hardware processor, the ROM may be accessed, and the decision tree is traversed (executed) to determine the predicted configuration.

Functional Overview

Figure 3:
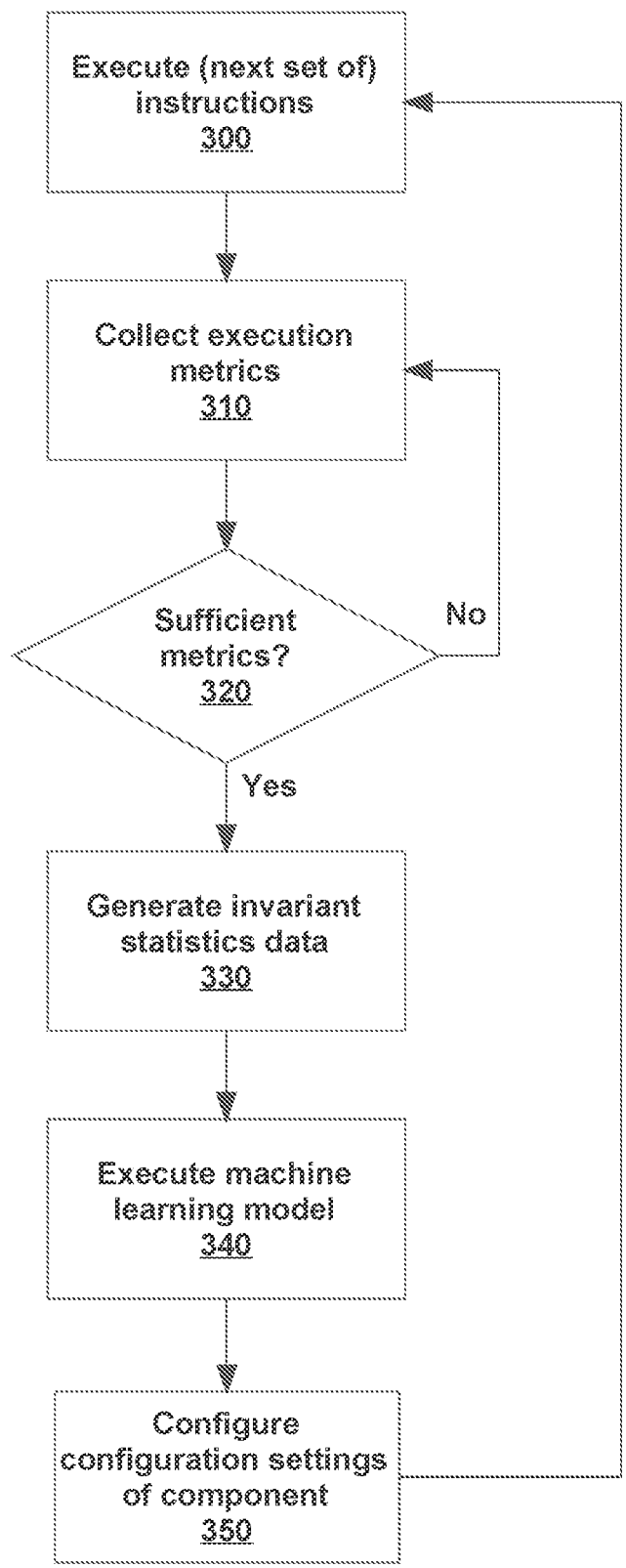
FIG. 3 is a flow diagram that depicts a process for configuring a component for optimal performance based on invariant statistics data, in an embodiment.

FIG. 3 is a flow diagram that depicts a process for configuring a component for optimal performance based on invariant statistics data, in an embodiment. At step 300, instructions for one or more applications are executed by a hardware processor, while the component of the hardware processor is configured with an initial configuration setting value.

At step 310, monitor counter(s) of the hardware processor collect various metrics while the hardware processor executes instructions of application(s). At step 320, it is determined whether a sufficient amount of metrics have been collected at step 310 to generate invariant statistics for configuring the component. The sufficiency threshold may be based upon a pre-defined number of executed instructions, a pre-defined number of clock cycles for the execution, and/or predefined logical boundary (an occurrence of a particular instruction or a particular pattern of instructions). When the threshold is reached, the method proceeds to step

330. At step 330, the obtained execution metrics are used to generate invariant statistics for the executed set of instructions, and a feature vector is generated that includes the invariant statistics data set for which the machine learning model was previously trained (according to techniques described in FIG. 1). For example, the threshold may be set to 100,000 instructions, and when the hardware processor executes 100,000th instructions, the collected execution metric is used to generate invariant statistics data set. In such an example, the configuration is evaluated every 100,000 instructions.

At step 340, the feature vector is provided to the machine learning model as an input. The trained parameters are applied to the feature vector according to the trained machine learning model, thereby generating predicted optimal configuration setting value for the configuration of the component. The predicted configuration setting value may be based on probabilities for mutually exclusive configuration settings. For example, the training model may predict with 0.6 (out of 1) probability that the enabled (ON) setting for a prefetcher is optimal and with 0.4 (out of 1) probability that the disabled (OFF) setting for the prefetcher is optimal. In such an embodiment, the setting value with the highest probability is selected for the component.

Even while the machine learning model is evaluated, the next set of instructions may continue to execute by the hardware processor at step 300. Once the new configuration setting is applied to the component, the next set of instructions is executed by the hardware processor with a new configuration for the component. Similar to the first set of instructions, the execution metrics for the next set of instructions are collected at step 310. Based on the execution metrics and changed invariant statistics at step 330, the predicted optimal setting value for the component may be evaluated to be different by the machine learning model at step 340. The different configuration is applied to the component at step 350, and the instruction set that follows executes with the different configuration for the component.

Accordingly, the component configuration may dynamically change based on the execution, and different applications may cause changes to the configuration setting of the component to improve its function and, thereby, the execution of the hardware processor.

Although techniques of FIG. 3 describes a single component; the same techniques are applicable to multiple components as long as the multiple components share the same configuration setting.

Software Computer System Overview

Figure 4:
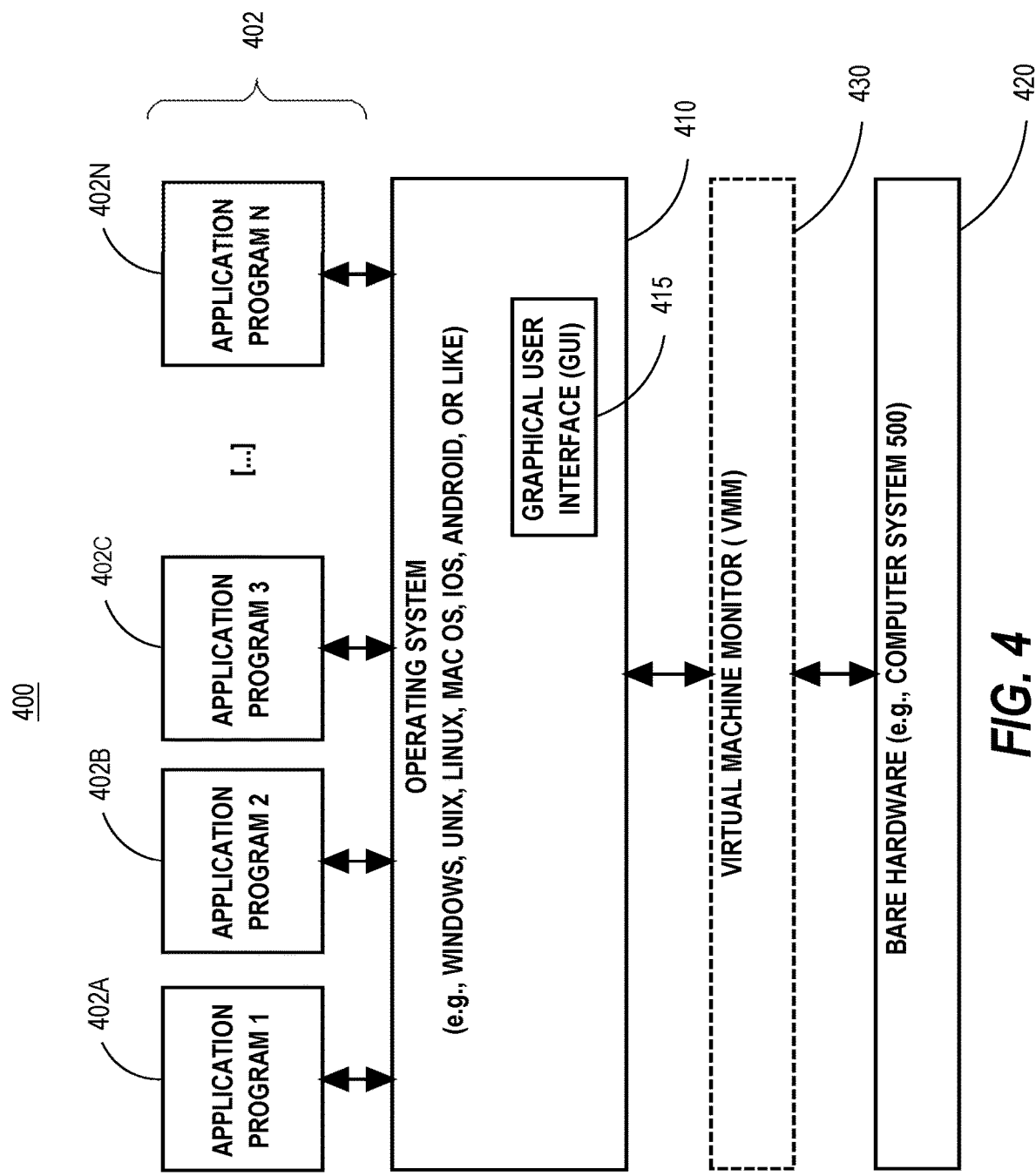
FIG. 4 is a block diagram of a basic software system, in one or more embodiments.
Figure 5:
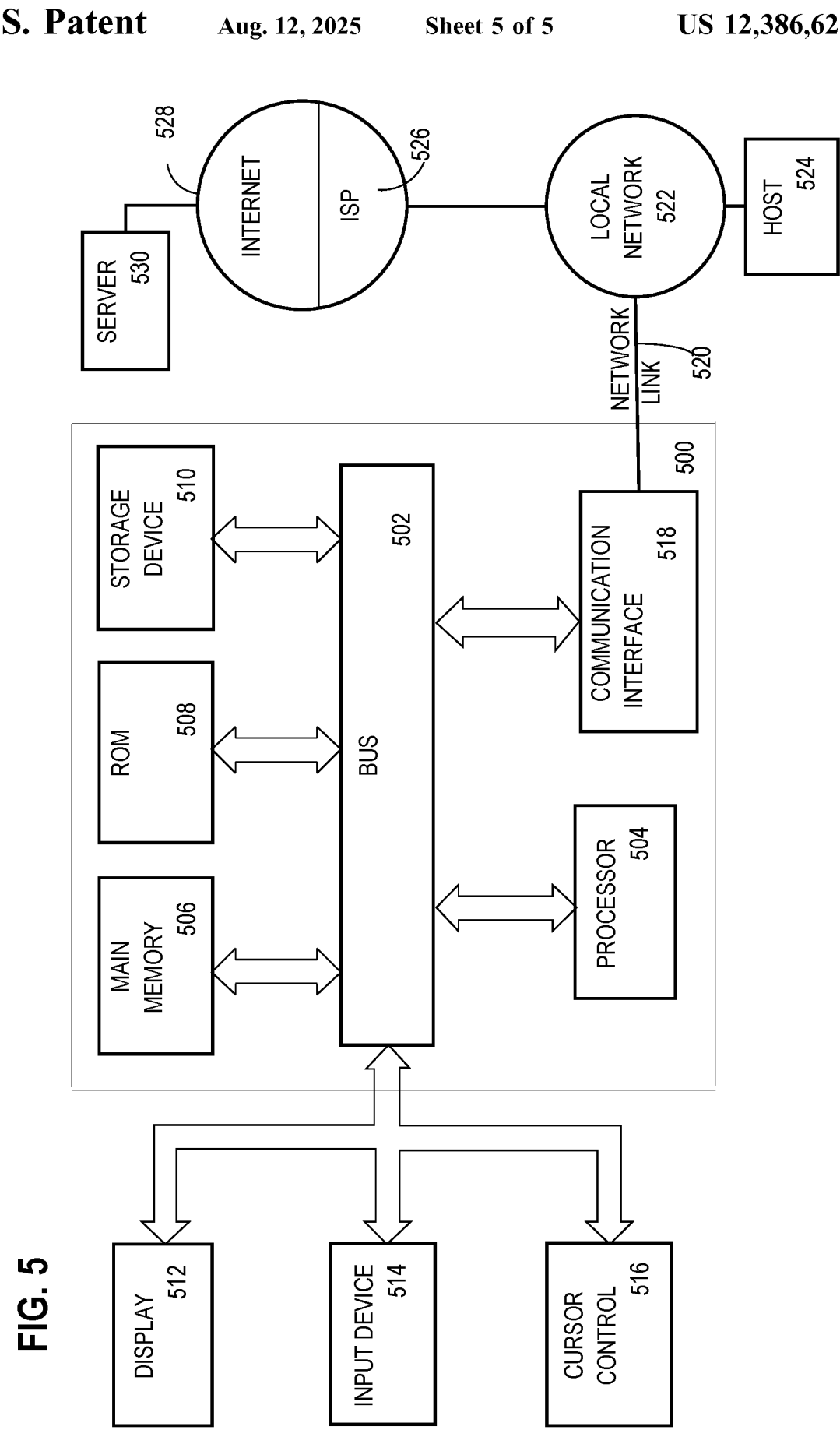
FIG. 5 is a block diagram that illustrates a computer system upon which an embodiment may be implemented.

FIG. 4 is a block diagram of a basic software system 400 that may be employed for controlling the operation of computing system 500 of FIG. 5. Software system 400 and its components, including their connections, relationships, and functions, are meant to be exemplary only and not meant to limit implementations of the example embodiment(s). Other software systems suitable for implementing the example embodiment(s) may have different components, including components with different connections, relationships, and functions.

Software system 400 is provided for directing the operation of computing system 500. Software system 400, which may be stored in system memory (RAM) 506 and on fixed storage (e.g., hard disk or flash memory) 510, includes a kernel or operating system (OS) 410.

The OS 410 manages low-level aspects of computer operation, including managing execution of processes, memory allocation, file input and output (I/O), and device I/O. One or more application programs represented as 402A, 402B, 402C . . . 402N, may be "loaded" (e.g., transferred from fixed storage 510 into memory 506) for execution by the system 400. The applications or other software intended for use on computer system 500 may also be stored as a set of downloadable computer-executable instructions, for example, for downloading and installation from an Internet location (e.g., a Web server, an app store, or another online service).

Software system 400 includes a graphical user interface (GUI) 415 for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 504) of computer system 500. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 500.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 500 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time and an allotment of memory (physical and/or virtual), the allotment of memory being for storing instructions executed by the hardware processor, for storing data generated by the hardware processor executing the instructions, and/or for storing the hardware processor state (e.g., the content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but share access to the memory allotted to the process. The memory is used to store the content of processors between the allotments when the thread is not running. The term thread may also be used to refer to a computer system process in multiple threads that are not running.

Hardware Computer System Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field-programmable gate arrays (FPGAs) that are persistently programmed to perform the techniques, or may include one or more general-purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques.

For example, FIG. 5 is a block diagram that illustrates a computer system 500 upon which an embodiment may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random access memory (RAM) or another dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read-only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware, and/or program logic, which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal, and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526, in turn, provides data communication services through the world wide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522, and communication interface 518.

The received code may be executed by processor 504 as it is received and/or stored in storage device 510 or other non-volatile storage for later execution.

Computing Nodes and Clusters

A computing node is a combination of one or more hardware processors that each share access to a byte-addressable memory. Each hardware processor is electronically coupled to registers on the same chip of the hardware processor and is capable of executing an instruction that references a memory address in the addressable memory, and that causes the hardware processor to load data at that memory address into any of the registers. In addition, a hardware processor may have access to its separate exclusive memory that is not accessible to other processors. The one or more hardware processors may be running under the control of the same operating system A hardware processor may comprise multiple core processors on the same chip, each core processor ("core") being capable of separately executing a machine code instruction within the same clock cycles as another of the multiple cores. Each core processor may be electronically coupled to connect to a scratchpad memory that cannot be accessed by any other core processor of the multiple core processors.

A cluster comprises computing nodes that each communicate with each other via a network. Each node in a cluster may be coupled to a network card or a network-integrated circuit on the same board of the computing node. Network communication between any two nodes occurs via the network card or network integrated circuit on one of the nodes and a network card or network integrated circuit of another of the nodes. The network may be configured to support remote direct memory access.

Cloud Computing

The term "cloud computing" is generally used herein to describe a computing model that enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by or within a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the runtime execution environment). Infrastructure as a Service (IaaS), in which consumers can deploy and run arbitrary software applications and/or provision processing, storage, networks, and other fundamental computing resources, while an IaaS provider manages or controls the underlying physical cloud infrastructure (i.e., everything below the operating system layer).

The described basic computer hardware and software and cloud computing environment presented for the purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A hardware processor comprising:
   configuration logic configured to:
   determine, during execution of instructions by the hardware processor, a setting value for an execution-time configuration setting of a component of the hardware processor, based, at least in part, on a first set of invariant statistics data that is based on execution metrics related to the same execution of instructions by the hardware processor;
   modify the execution-time configuration setting for the component of the hardware processor with the setting value;

wherein a change in the execution-time configuration setting for the component of the hardware processor affects execution of next instructions by the hardware processor;

wherein the execution metrics, on which the first set of invariant statistics data is based, exclude performance metrics of the component.

2. The hardware processor of claim 1, wherein the execution metrics includes metrics related to one or more instruction counts measured during execution of the hardware processor.

3. The hardware processor of claim 2, wherein the one or more instruction counts of instructions includes one or more of: number of dynamic instructions during execution of the hardware processor, number of static instructions during execution of the hardware processor, number of branch instructions during execution of the hardware processor, or number of target addresses per an indirect branch instruction during execution of the hardware processor.

4. The hardware processor of claim 1, wherein the execution metrics includes metrics related to memory access metrics measured during execution of the hardware processor.

5. The hardware processor of claim 4, wherein the memory access metrics includes one or more of: number of unique instruction addresses accessed, number of unique data addresses accessed, number of pages loaded, or amount of memory loaded per page.

6. The hardware processor of claim 1, wherein the execution metrics includes metrics related to branch behavior metrics measured during execution of the hardware processor.

7. The hardware processor of claim 6, wherein the branch behavior metrics includes one or more of: number of taken branch instructions, number of not taken branch instructions, length of target offset, total number of forward branches, or total number of backward branches.

8. The hardware processor of claim 1, wherein the configuration logic further comprises of a machine learning model logic for the execution-time configuration setting for the component, the machine learning model logic executing on a machine learning model trained with a training set of invariant statistics data.

9. The hardware processor of claim 1, wherein the hardware processor is configured to:
obtain a training set of invariant statistics data that includes a training set of feature vectors and a corresponding set of expected results for the execution-time configuration setting for the component;
provide each feature vector in the training set of feature vectors as input to a machine learning algorithm;
calculate a prediction set of values for the execution-time configuration setting for the component by applying a set of parameter values to said each feature vector of the training set of feature vectors;
based on comparing the prediction set of values to the corresponding set of expected results for the execution-time configuration setting for the component, modify the set of parameter values.

10. The hardware processor of claim 1, further comprising:
memory at least in part storing a first set of instructions;
wherein the execution-time configuration setting for the component is set to an initial setting value;

wherein the hardware processor is configured to:
execute the first set of instructions causing to generate the first set of invariant statistics data based on the execution metrics;
wherein the configuration logic is configured to:
determine a first new setting value for the execution-time configuration setting for the component based on the first set of invariant statistics data,
apply the first new setting value to the execution-time configuration setting for the component thereby reconfiguring the component to the first new setting value; and
execute a second set of instructions having the component reconfigured with the first new setting value.

11. The hardware processor of claim 10, wherein generating the first set of invariant statistics data based on the execution metrics related to executing by the hardware processor the first set of instructions includes calculating memory access pattern statistics by:
determining one or more patterns of memory accesses during the executing of the first set of instructions;
calculating a number of memory accesses for each of the one or more patterns of memory accesses during executing by the hardware processor the first set of instructions.

12. The hardware processor of claim 11, wherein the one or more patterns of memory accesses includes: striding access, streaming access, or spatial access.

13. The hardware processor of claim 10, wherein the execution metrics is a first execution metrics, and wherein executing by the hardware processor the second set of instructions, having the component reconfigured with the first new setting value, causes generating a second set of invariant statistics data, different from the first set of invariant statistics data, based on second execution metrics related to executing by the hardware processor the second set of instructions;
wherein the configuration logic performs:
receiving the second set of invariant statistics data as input to the configuration logic,
determining a second new setting value, different from the first new setting value, for the execution-time configuration setting for the component based on the first set of invariant statistics data,
applying the second new setting value to the execution-time configuration setting for the component thereby reconfiguring the component; and
wherein the hardware processor executes a next set of instructions having the component reconfigured with the second new setting value.

14. The hardware processor of claim 10, further comprising:
a plurality of components that includes the component, each of the plurality of components having a corresponding execution-time configuration setting, which is set to the initial setting value;
wherein the hardware processor executing the first set of instructions causes generating the first set of invariant statistics data based on the execution metrics related to executing by the hardware processor the first set of instructions while said each of the plurality of components having the corresponding execution-time configuration setting set to the initial setting value;
wherein the configuration logic configures the corresponding execution-time configuration setting of said each of the plurality of components to the first new setting value.

15. A computer-implemented method comprising:
- determine, during execution of instructions by a hardware processor, a setting value for an execution-time configuration setting of a component of the hardware processor, based, at least in part, on a first set of invariant statistics data that is based on execution metrics related to the same execution of instructions by the hardware processor;
- modify the execution-time configuration setting for the component of the hardware processor with the setting value;
- wherein a change in the execution-time configuration setting for the component of the hardware processor affects execution of next instructions by the hardware processor;
- wherein the execution metrics, on which the first set of invariant statistics data is based, exclude performance metrics of the component.

16. The method of claim 15, wherein the execution metrics includes one or more: metrics related to one or more instruction counts measured during execution of the hardware processor; metrics related to memory access metrics measured during execution of the hardware processor; and metrics related to branch behavior metrics measured during execution of the hardware processor.

17. The method of claim 15, further comprising:
- obtaining a training set of invariant statistics data that includes a training set of feature vectors and a corresponding set of expected results for the execution-time configuration setting for the component;
- providing each feature vector in the training set of feature vectors as input to a machine learning algorithm;
- calculating a prediction set of values for the execution-time configuration setting for the component by applying a set of parameter values to said each feature vector of the training set of feature vectors;
- based on comparing the prediction set of values to the corresponding set of expected results for the execution-time configuration setting for the component, modifying the set of parameter values.

18. The method of claim 15, wherein the execution-time configuration setting for the component is set to an initial setting value and the method further comprising:
- executing a first set of instructions thereby generating the first set of invariant statistics data based on the execution metrics;
- determining a first new setting value for the execution-time configuration setting for the component based on the first set of invariant statistics data;
- applying the first new setting value to the execution-time configuration setting for the component thereby reconfiguring the component to the first new setting value; and
- executing a second set of instructions, having the component reconfigured with the first new setting value.

* * * * *